United States Patent

[11] 3,618,002

[72] Inventor William E. Stinson, Renton, Wash.
[21] Appl. No. 15,706
[22] Filed Mar. 2, 1970
[45] Patented Nov. 2, 1971
[73] Assignee The Boeing Company, Seattle, Wash.

[54] WINDSHEAR WARNING SYSTEM AND INDICATOR
10 Claims, 4 Drawing Figs.

[52] U.S. Cl. .................................................. 340/27 R
[51] Int. Cl. ...................................................... B64d 45/00
[50] Field of Search ............................................. 340/27; 244/77 A, 77 D; 73/170, 178

[56] References Cited
UNITED STATES PATENTS
3,149,491  9/1964  Sissenwine et al. ............ 73/178

Primary Examiner—Kathleen H. Claffy
Assistant Examiner—Jan S. Black
Attorneys—Glenn Orlob and Nicolaas De Vogel ABSTRACT: A flight control system and indicator to inform a pilot in advance if a potential windshear condition exists between the aircraft and the airport of intended landing. Current wind velocity and ground speed information from the airport vicinity and the velocity of the aircraft are used as inputs for electrically calculating a signal equal to windshear velocity potential value. This signal is continuously corrected by current input variations and displayed by the indicator to the pilot during his approach and descent. If this value persists as descent continues, it constitutes a quantitative warning of an imminent windshear.

PATENTED NOV 2 1971 3,618,002

INVENTOR.
WILLIAM E. STINSON
BY
AGENT

INVENTOR.
WILLIAM E. STINSON

INVENTOR.
WILLIAM E. STINSON
BY
AGENT

WINDSHEAR WARNING SYSTEM AND INDICATOR

BACKGROUND OF THE INVENTION

1. Field of the Invention

This invention relates to aircraft landing instrument display systems and more particularly to a system and indicator displaying windshear existence during aircraft approach and descent.

2. Description of the Prior Art

Automatic systems calculated to cope with the windshear problem during landing approaches have been recorded; for example, in the U.S. Pat. No. 3,295,796 by R. Gaylor an automatic system is presented for correcting slight windshear effects during automatic ILS (Instrument Landing System) landing. However, during a severe windshear condition, this system would not compensate enough to save the airplane from possible sudden loss of altitude.

In the U.S. Pat. No. 2,663,520 by F. Moseley a somewhat analogous radio-controlled system is disclosed for correcting automatically the throttle control while receiving ILS signals in combination with gyro drift and wind velocity during aircraft descent. This system gives no advance warning.

In addition there are various patents issued which show systems wherein means are proposed for determining wind velocity on the ground and also there are patents which are related to means for determining wind velocity in the vicinity of the aircraft. The following patents relate to these discoveries: U.S Pat. Nos. 2,202,987, to Egenas; 2,320,359, to Gatty; 2,613,352, to Kellogg 2nd, 2,952,405, to Guarino; 3,217,536, to Motsinger et al., 3,420,101, to Adams.

However, none of the above-referenced patents revealed art that is relevant and/or pertinent to the concept of the present invention.

Therefore, a system and apparatus for displaying current warning information to the pilot with respect to serious windshear conditions and which system uses the input combination of two different wind vector intelligence appears to be unobvious, since a search in this art failed to produce any patent recordings or publications.

SUMMARY OF THE INVENTION

Windshear existence is one of the most dangerous elements that an aircraft can encounter during approach. The most alarming fact is that its location strength and shape is practically unpredictable and undetectable, and every aircraft pilot during descent and landing is facing an unknown between approach lineup and runway threshold.

Making the problem of even greater concern is the fact that there are various types of windshears, some of which are disposed in a vertical, horizontal, diagonal or curved plane, and when intersecting with a runway heading or aircraft landing approach, a serious problem is present for a landing aircraft.

Until now this problem is known to exist to many people familiar with this art, such as flight crews, but many tend to underestimate the danger involved. In order to visualize the importance of the present invention and for the sake of safety to aircraft, it is deemed justified to sketch the following typical situation:

"The jetliner was on the final approach. Ceiling and visibility were barely above limits, and the reported surface wind amounted to but an insignificant crosswind on the ILS runway. The aircraft had been slowed to recommended airspeed prior to arriving over the outer marker, and was now proceeding down the glide slope with normal power and flight control settings for this maneuver. Shortly after leaving 1,000 feet the pilot noticed that the aircraft was above the glide slope, so he adjusted the flight controls to get it back on the slope. At about the same time he also noticed that the airspeed was not bleeding off as it normally does during a final approach, so he pulled back on the throttles to reduce thrust. However, the abnormally fast and high tendency persisted, and after several successive attempts to adjust the flight path and airspeed, the pilot had to abort the approach and pull out for another try. Before executing a second approach the pilot analyzed what had happened during the first, unsuccessful approach, and this time came in for a normal landing."

Why was the aircraft too high and too fast on the first attempt at an approach? It was simply a case of strong vertical gradient of the horizontal wind, which increased the airspeed during the descent faster than the pilot effected adjustment of his power settings and flight controls. He recognized this and applied proper flight techniques to achieve a successful landing on his second approach.

It will be evident from the foregoing that a windshear indicating device as disclosed by the present invention will be a needed flight control improvement.

The treatise of this invention uses as its main components the values of speed and direction of the wind and the moving aircraft. Strictly speaking, speed and direction are equal to velocity and thus present a vectorial quantity. However, since the term "velocity" is more loosely used as merely synonymous with speed, a misunderstanding may occur. Therefore, the term velocity used herein should be regarded as a vectorial quantity only.

To successfully and skillfully transit a windshear the pilot needs advance warning of the potential velocity change (vector) of the shear. Since most windshears are associated with stability and surface inversions, little or no turbulence exists to give warning of approach to or entering a windshear. The shear is nearly impossible to predict. When its existence is realized, it is difficult to quantify.

Pilot reports represent almost the only means of dissemination of information on the phenomenon. Prior to the conception of the present invention it was concluded that if a warning device could be developed to measure the force of a shear, it should also exhibit a quantitative warning to the pilot in time for him to 1. adjust speed so that extra lift margin may be held in reserve,
2. be prepared to adjust thrust to compensate for drag change at the right time,
3. be ready Γ increase angle of attack or to actuate high lift devices to avoid change of altitude due to changes of speed, or
4. abort the approach if he feels he is unable to transit the shear with the aids at his command.

A windshear can be considered to be a discrepancy between wind conditions at the aircraft and the airport. It exhibits itself to the pilot as a sudden change in air mass velocity and can come from any direction.

A windshear may be more exactly defined as a vertical gradient of the horizontal wind and is measured in speed change of this wind, (knots) per hundred feet of altitude. Windshear values are rates of change of velocity.

To comprehend all the possible paths through a shear presents a difficult problem, hence training a pilot to cope with the phenomenon has necessarily been limited to a few examples. Since a severe shear is a relatively rare occurrence and therefore seems to come as a surprise, and since it perhaps is one of the strongest influences in establishing the approach velocity margin over the stall for our contemporary aircraft, it seems fitting that we should attempt to eliminate the element of surprise and make possible the use of the aircraft within the limit of this margin required for unknowns. As Boundary Layer Control (BLC) and other high lift concepts reduce the approach speeds and the short takeoff and landing (STOL) concept becomes more common, windshears and related phenomena become proportionately larger. Recognition and evaluation of the shear thus becomes more important.

The potential problem of windshear while executing an approach to landing can be recognized easily provided the elements of information are put together in rational form. The advent of Doppler and distance and speed-measuring equipment (DME) located with respect to the instrument landing system will make feasible this recognition. The elements involved are surface wind velocity, ground speed, Doppler, DME, the ILS localizer or VOR inbound heading and true airspeed. One might easily assume the pilot could solve this problem involving the difference of these factors in his head, and in some cases this is true. However, in the interest of reduction of flight deck work load, errors, and disbelief, the inclusion of a simple computer to give a windshear warning appears justified to enhance airplane safety, so that time is available to actuate a throttle, high lift devices or pull back on the controls.

In certain meteorological situations, air mass excursions can take place and go unrecognized for fairly long periods. During such occurrences an aircraft making an approach to landing may encounter shear conditions that can be of a serious and even of a catastrophic nature. Surface winds and winds aloft, above 2,000 feet, give little or no warning of the air mass movement to either the pilot or tower personnel. Windshears, principally the vertical shear of the horizontal wind, happen in clear air under conditions of stability when they are least expected. Nighttime occurrences make reference to ground objects difficult. Traffic density after midnight is low and pilot reports scarce.

Use of all the information available, however, with a convenient, easily visible output in the form of a quantitative warning device minimizes the problem due to the lack of reporting of windshears. Using indicated airspeed as a base, corrected for altitude and temperature to read true speed of the airplane in the air or $V_t$, adding or subtracting the DME or Doppler $V_g$ and adding or subtracting surface wind to the difference, will give the value of the potential shear. If the magnitude of the potential is high enough and persists as the airplane altitude decreases, the warning is apparent. If the windshear occurs at a sharp line of demarcation, perhaps near the ground, the indicated value on initial approach, at 1,200–1,500 feet above ground level will, when divided by the altitude, show only a nominal potential gradient. However, as altitude decreases, if the value persists, the rate of the windshear is quantified. In any case, the amount of change in speed or lift will be indicated.

In the basic expression, windshear in knots or $$V_{ws} = V_t \pm V_g \pm V_s$$

wherein:

$V_{ws}$ = velocity, windshear knots per 100 feet (a rate)
$V_t$ = aircraft true airspeed
$V_g$ = aircraft ground speed
$V_s$ = airfield surface wind, it is clear that vectors must be added, as crosswinds or even tailwinds can modify the result by a large factor.

Correcting for these vectors, it then is clear that $V_{ws} = [\cos(\Gamma - \Gamma_o)V_t] \pm V_g \pm [\cos(\Gamma_s - \Gamma_o)V_s]$
wherein   $\Gamma$ = aircraft heading
$\Gamma_o$ = ILS localizer, VOR heading or runway heading, and
$\Gamma_s$ = surface wind vector.

$V_{ws}$ then becomes a velocity vector relative to the aircraft heading, and assumes the potential velocity of the windshear, either a headwind or tailwind. The shear will then become manageable because the magnitude is known.

It will be necessary for the pilot to input the runway or approach heading (localizer or VOR radial inbound) and the airfield surface wind velocity. Other inputs, including Doppler or DME, IAS altitude and temperature will be continuous and automatic.

A further function of this device would be to actuate the high lift configuration or auto throttle to a configuration compatible with $V_{ws}$ conditions.

It is therefore an object of the present invention to provide for a system which shows the possible existence of a shearwind condition by calculating the discrepancy between wind velocity vectors occurring at two different locations.

A further object of the present invention is to provide for a windshear indicator device which warns the pilot during his descent for landing that a windshear in a certain direction and magnitude may exist.

IN THE FIGURES

DESCRIPTION OF THE INVENTION

Figure 1:
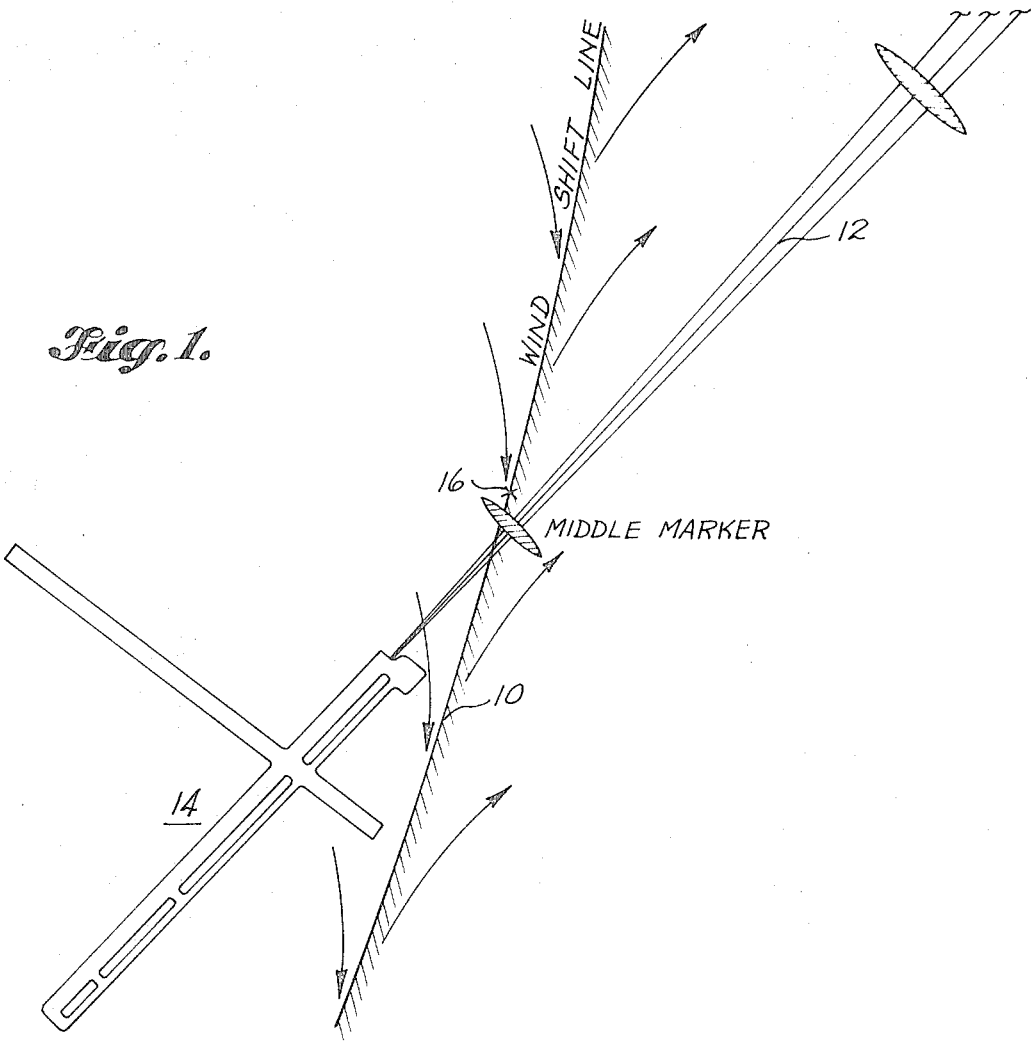
FIG. 1 illustrates a pictorial view of an airfield and an imaginary horizontal wind shift line intersecting the aircraft approach.
Figure 2:
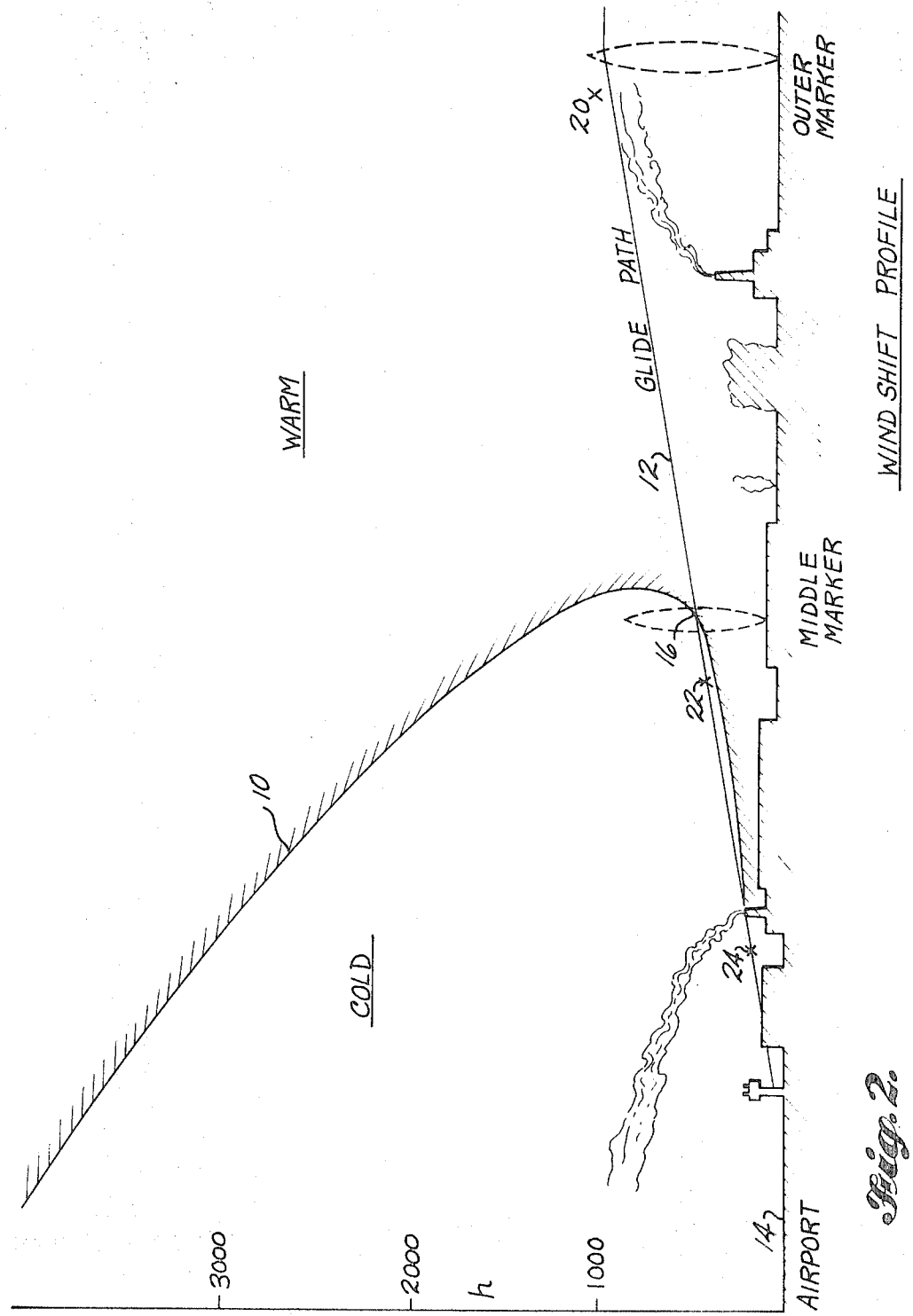
FIG. 2 is a cross-sectional view of the approach shown in FIG. 1 and its assumed vertical windshear existence.

There are many varieties of windshears, some of which are severe enough to cause serious results to an aircraft when the windshear intersects the landing approach. In FIG. 1 and 2 it is assumed that a windshear exists which shift line 10 intersects the approach 12 of airfield 14.

The windshear condition illustrated in FIG. 1 and 2 is one of the simple types and is used herein for illustrative and explanatory purposes only. However, it should be realized that most windshears are of a different nature. The aircraft experienced an abrupt change of wind velocity at point 16 where the approach or glide path 12 intersects with the windshift line 10. As has been described herein, it is impossible to tell where this point 16 occurs and of course the continuous moving of the shiftline 10, in this case a cold front, changes the location of this intersecting point 16.

Referring now to FIG. 2 it is assumed that at location 20, the aircraft (not shown) is flying at 200 knots airspeed in a 10 knots headwind resulting in a ground speed of 190 knots. Furthermore, it is assumed that there is a sharp wind shift line 10 between locations 20 and 22 as illustrated, wherein the wind reverses its direction to a 40 knot tailwind. Due to the sharp windshift line 10, the aircraft could transverse from location 20 to location 22 almost instantly and would therefore still have a ground speed of nearly 190 knots at location 22. Because the net wind change along the glide path 12 is 50 m.p.h. (−10 to +40), the airspeed would drop to 150 knots at location 22. Finally, the airspeed would very slowly return to 200 knots at location 24 as the aircraft accelerates from 190 to 240 knots ground speed.

In another example the following circumstances illustrate what may happen to a heavy transport aircraft on its final approach near the ground: The aircraft is descending from a headwind into a calm area at the runway. The aircraft has an airspeed of 100 knots in a headwind of 20 knots, thus with a groundspeed of 80 knots; if the aircraft is placed quickly into a calm area near the end of the runway, the airspeed then reduces to 80 knots. If the pilot then wishes to execute a missed approach, his time to accelerate is illustrated by the following data:

Elapsed times to reach the indicated airspeeds in calm air are, from flight tests of a Lockheed Constellation, as follows: (Flaps and landing gear for this test remain extended.)

| | |
|---|---|
| 80 knots | 0 sec. |
| 86 knots | 39.0 sec. |
| 90 knots | 77.5 sec. |
| 96 knots | 175.5 sec. |

Whether or not the aircraft crashes as a result of its inability to recover speed is a problem of the lift and the effect of the controls. It is thus obvious that sufficient speed margin is needed when an aircraft is flown relatively close to the stalling speed during final approach.

Figure 3:
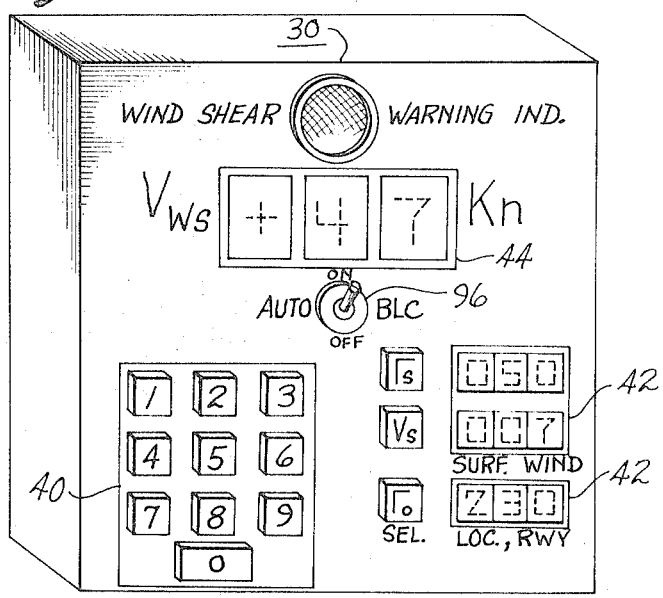
FIG. 3 shows a suggested layout for a windshear indicating and warning device.

The indicator 30 shown in FIG. 3 is provided with several permanent inputs which are described in the electronic circuitry shown in FIG. 4, and explained hereinafter. The face portion of the indicator 30 has a keyboard 40 with punch buttons for providing input of data from radio ground stations. For example, the pilot receiving from the airfield information relating to surface wind direction will then press the $\Gamma_s$ button and thereafter press the quantitative information on the keyboard 40. The same procedure is followed for the surface wind speed data and the ILS or runway compass heading information by respectively pressing the indicated button $V_s$ and $\Gamma_o$ and the quantitive number on the keyboard 40.

For checking purposes the information which is manually keyed into the windshear indicator 30 is shown in the digital display windows 42. Assuming that this foregoing information has been supplied and has been fed into the indicator, the $V_{ws}$ or windshear velocity indicating window 44 will then automatically show the expected gross windshear velocity.

Figure 4:
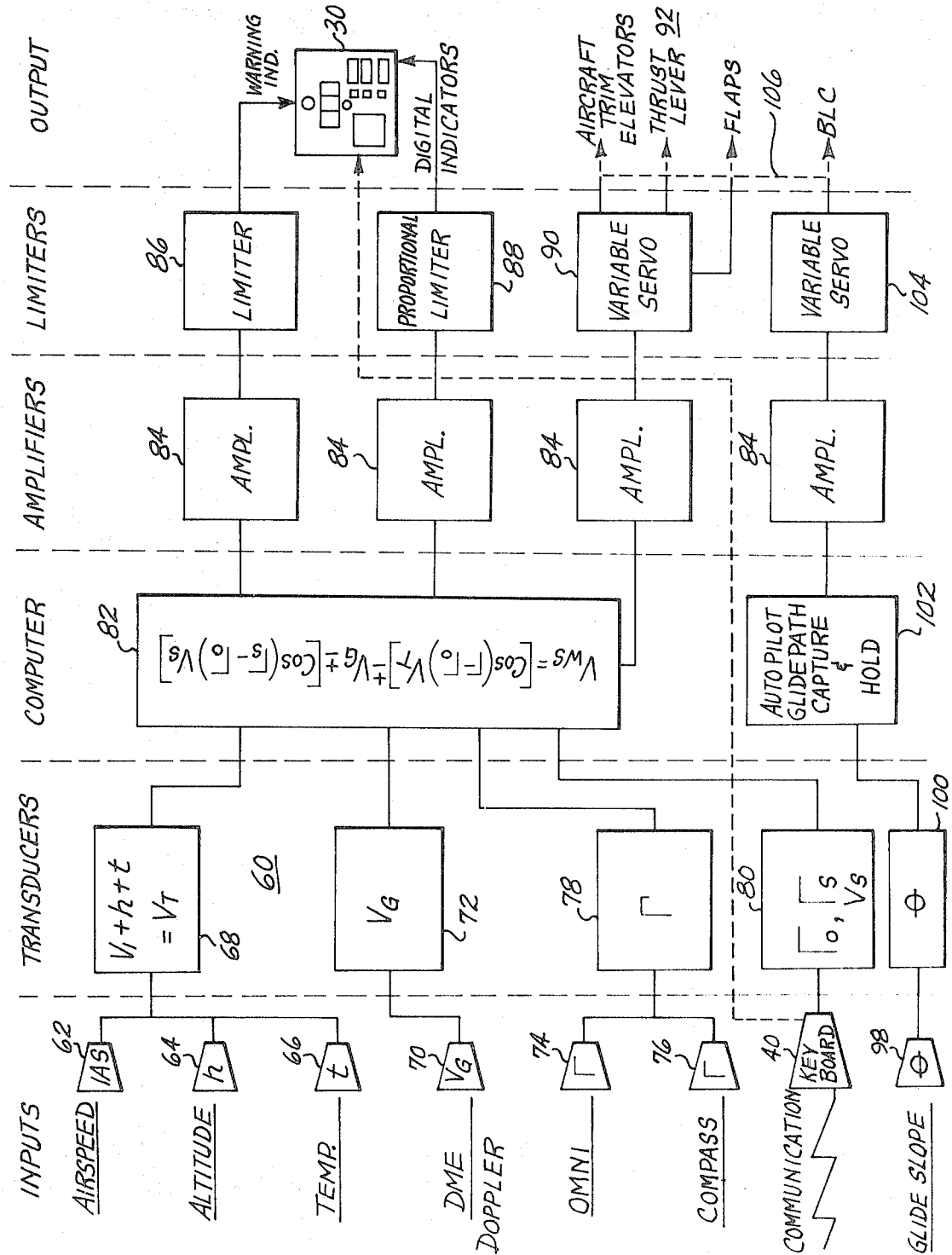
FIG. 4 is a block diagram of the electronic circuitry involved embodying the present invention.

Referring now to FIG. 4 there is shown an electronic circuitry 60 which forms the complete system together with the indicator 30 for the present windshear warning invention.

The electronic circuit 60 comprises a plurality of necessary inputs derived from associated aircraft instrumentation.

The true airspeed $V_t$ of the aircraft flying through the air is received from an airspeed instrument 62 and is corrected by the altitude instrument 64 and a temperature-measuring instrument 66 and fed as an input into a first transducer circuit 68. Information relative to groundspeed $V_g$ is derived from either a Doppler radar on board the aircraft or from a DME (distance and speed-measuring equipment ground station) 70 and fed into a second transducer 72.

The VHF omnidirectional range or VOR 74 and the aircraft compass heading 76 are used as input to a third transducer circuit 78.

A fourth transducer 80 is connected via the keyboard and radio-received information relative to $\Gamma_o$ =ILS or runway heading, $\Gamma_s$ airfield surface wind vector and $V_s$ airfield surface wind velocity as mentioned before is manually fed into the circuitry 60 via the transducer 80.

An electric computer such as an analog type computer 82 is directly connected to each of the transducers 68, 72, 78 and 80 and a vectorial summing of the various signals will be performed so that a windshear gross quantity and directional signal emerges.

As shown in this preferred circuitry, special amplifiers 84 and limiter circuits 86 and 88 have been provided for individually operating a warning indicator at a certain predetermined level of windshear. For instance, according to the International Meteorological Weather Institute, windshear strength is indicated as follows:

| Strength | |
| --- | --- |
| Low | 0–4 knots per 100 feet altitude |
| Medium | 5–8 knots per 100 feet altitude |
| High | 9–12 knots per 100 feet altitude |
| Severe | 12 and up knots per 100 feet altitude |

Thus, a certain warning light may be installed for providing a visual warning at severe windshears or a certain color for a particular range, etc., all of which is optional to design and/or demand. The electrical signal to operate this warning light may come from the division of the windshear value by altitude. When the quotient exceeds a given value, the warning light is activated.

The proportional limiter circuit 88 operates the direction and quantity display window. The direction is given as a (+) when the true air velocity exceeds ground velocity of the aircraft and a (−) when the ground velocity exceeds air velocity.

In addition to the circuitry 60, an automatic control can be visualized by the special variable servo limiter circuitry 90 which is indirectly connected via associated actuating means 92 to high lift devices autopilot and throttle (not shown). Furthermore, it can easily be visualized to a person familiar with the navigational instrumentation art that an autopilot operated airplane in coordination with the foregoing permanent inputs can provide automatic windshear adjustment of flight controls prior to hitting the windshear shiftline so that recovery of speed and lift is automatically arranged.

For this reason the windshear indicator 30 is provided with an "on" automatic pilot switch 96 as shown FIG. 3. In the block diagram circuit 60 an existing conventional electric circuitry portion is shown, having a glide slope input 98 connected to a transducer 100 which converts the glide slope information into a signal that will be coordinated with a conventional presently used autopilot glide path capture-and-hold computer 102.

The computer 102 output is via a variable servo limiter 104 connected to the BLC or Boundary Layer Control devices. However, the improvement suggested herein is the interconnection 106 of the main output of the circuitry 60 with the BLC, so that an automatic safety factor is incorporated in the automatic pilot in case of severe windshear existence. Activation of automatic pilot ILS with the windshear circuitry output is achieved by the switching of switch 96 in the "on" position.

OPERATION PROCEDURE FOR PILOT OR NAVIGATOR

In summary, it should be understood that when an aircraft is established on the glidepath for final descent to the runway threshold, the pilot will monitor the windshear warning indicator 30 as described hereinbefore.

If the indicated $V_{ws}$ value persists or sustains as altitude decreases (does not diminish as altitude decreases) then the windshear gradient is increasing. The value shows on the indicator then as a quantitative warning during the final stages of the approach.

In such a case the imminent danger is apparent and immediate action is required in the form of increased speed margin over the aircraft stall speed.

At present the existing navigation flight control instrumentation on aircraft does not carry a device as described and thus does not have the means to determine windshear velocity potential.

It is suggested and will be obvious that the present invention is a great improvement for the safety of flight during approach and should be available to the flight crew.

Having thus described the preferred embodiment of this invention, it will be obvious that various other structural modifications may be contemplated by those skilled in the art without departing from the spirit and scope of the invention as hereafter defined by the appended claims.

I claim:

1. A windshear warning system for automatically indicating the existence of windshear and its velocity between an aircraft and the airfield of intended landing, comprising:
   a. means for determining true velocity data of said airplane through the air, including electrical circuit means to produce an electrical signal equivalent to said data,
   b. means for determining said airplane ground velocity intelligence, including electrical circuit means to produce an electrical signal equivalent to said intelligence,
   c. means for determining surface wind velocity and runway heading information of said airfield, including electrical circuit means to produce an electrical signal equivalent to said information,
   d. electrical computer means having input means for receiving said data signal, said intelligence signal and said information signal and for calculating said signals into an electrical signal representing said windshear velocity and
   e. indicating means electrically connected to said computer means for digital display of said windshear velocity signal.

2. A windshear warning system for automatically indicating the existence of windshear and its velocity between an aircraft and the airfield of intended landing as claimed in claim 1 wherein said means for determining true velocity data of said airplane through the air is carried on the airplane and comprises instrumentation including
   a. means for sensing airspeed,
   b. means for sensing ambient temperature,
   c. means for sensing aircraft altitude and
   d. interconnecting means between said airspeed means and said temperature and altitude means for correcting said airspeed thereby so that said velocity data is obtained and whereby said velocity data serves as input to said electrical circuit means included with said means for determining true velocity data for producing said electrical signal equivalent to said input.

3. A windshear warning system for automatically indicating the existence of windshear and its velocity between an aircraft and the airfield of intended landing as claimed in claim 2 wherein said means for determining surface wind velocity and runway heading information is located at said airfield of intended landing and wherein said information is transmitted to said aircraft.

4. A windshear warning system for automatically indicating the existence of windshear and its velocity between an aircraft and the airfield of intended landing as claimed in claim 3 wherein aid indicating means comprises a keyboard for manual input of said surface wind velocity and runway heading information transmitted to said aircraft.

5. A windshear warning system for automatically indicating the existence of windshear and its velocity between an aircraft and the airfield of intended landing as claimed in claim 4 wherein said means for determining airplane ground velocity intelligence is derived from a radar Doppler instrument carried by said aircraft.

6. A windshear warning system for automatically indicating the existence of windshear and its velocity between an aircraft and the airfield of intended landing as claimed in claim 4 wherein said means for determining airplane ground velocity intelligence is located at an associated distance-measuring equipment ground station and wherein said intelligence is transmitted to said aircraft.

7. A windshear warning indicating instrument having a windshear display means for aircraft comprising an electric circuitry including
   a. a first transducer for receiving airspeed, altitude and temperature information from said aircraft associated instrumentation,
   b. a second transducer for receiving ground velocity intelligence from associated aircraft-carried radar Doppler instrumentation or from associated radio-received ground-located distance-measuring equipment instrumentation,
   c. a third transducer for receiving said aircraft associated heading information and aircraft associated VHF omnidirectional range heading information,
   d. a fourth transducer for receiving runway heading information and airfield surface wind speed and direction information,
   e. computer means having input means connected to said first, second, third and fourth transducer for calculating said transducers information into three individual signals respectively representing a first signal equivalent to said aircraft true airspeed corrected by the cosine of said aircraft heading minus said runway heading, second signal equivalent to said aircraft ground velocity, third signal equivalent to said airfield surface windspeed corrected by the cosine of said airfield surface wind vector minus said runway heading, and wherein said three signals are vectorially summed into a signal representing a vectorial value equivalent to a windshear vector in knots and
   f. limiter circuitry connected to said computer means for converting said vectorial value signal into a visual display by said windshear display means on said indicating instrument.

8. A windshear warning indicating instrument as claimed in claim 7 wherein said fourth transducer for receiving runway heading information and airfield surface wind direction and speed is electrically interconnected with a mechanical manually operated keyboard or the like for adding said runway information and said airfield surface windspeed and direction information into said computer.

9. A windshear warning system and indicator device for aircraft comprising a computer for summing vectorial values received in proportional equivalency with one another in the form of electrical signals wherein a first signal represents true velocity of the aircraft through the air, a second signal represents airplane ground velocity, a third signal represents airfield surface wind velocity and a fourth signal represents runway heading information, and means for converting said computer vectorially resultant summed signal into a visual quantative display on said indicator device having a positive or negative value for direction indication wherein said positive value indicates a windshear having a general head-on and a negative value indicates a windshear having a general tailwind direction in reference to said aircraft.

10. A windshear warning system and indicator device for aircraft as claimed in claim 9 wherein said quantative display on said indicator device is provided with light warning means for values of said quantative signal display having a predetermined severity.

* * * * *